United States Patent

Soichiro et al.

[15] 3,643,562
[45] Feb. 22, 1972

[54] PROGRAMMING SHUTTER FOR A PHOTOGRAPHIC CAMERA

[72] Inventors: Matsuzaki Soichiro; Masanobu Sato; Kato Toshikazu, all of Tokyo, Japan

[73] Assignee: Olympus Optical Co., Ltd., Tokyo, Japan

[22] Filed: Nov. 17, 1970

[21] Appl. No.: 90,289

[30] Foreign Application Priority Data

Nov. 22, 1969 Japan..............................44/111050
Nov. 27, 1969 Japan..............................44/112675

[52] U.S. Cl.............................................95/10 CE, 95/53 E
[51] Int. Cl............................................................G01j 1/04
[58] Field of Search.................95/53 R, 53 E, 53 EA, 53 EB, 95/10 CE, 10 CT, 10 CD, 10 C

[56] References Cited

UNITED STATES PATENTS

| 3,545,362 | 12/1970 | Kitai | 95/64 A |
|---|---|---|---|
| 3,492,928 | 2/1970 | Kitai | 95/64 A X |
| 3,326,108 | 6/1967 | Kitai | 95/64 A |
| 3,309,974 | 3/1967 | Yoshiyama | 95/10 C |
| 3,500,731 | 3/1970 | Bresson | 95/10 C |
| 3,464,333 | 9/1969 | Aoki | 95/10 C |

*Primary Examiner*—John M. Horan
*Assistant Examiner*—Monroe H. Hayes
*Attorney*—Kelman & Berman

[57] ABSTRACT

A photographic shutter in which the shutter blades are opened to such an extent as to define the effective aperture of the objective corresponding to the scene brightness for obtaining the proper exposure. The shutter has a first lever which pivots through a predetermined angle each time the shutter is operated, a second lever coupled with a shutter blade operating ring so as to open the shutter blades to an objective aperture corresponding to the pivoting movement of the second lever, and a third lever interposed between the first and second levers so as to transmit the movement of the first lever to the second lever. The pivot axis of the third lever is shifted in accordance with the scene brightness sensed by a photoelectric exposure control device so that the second lever is moved at a variable transmission ratio by the first lever in accordance with the sensed scene brightness for proper exposure.

4 Claims, 11 Drawing Figures

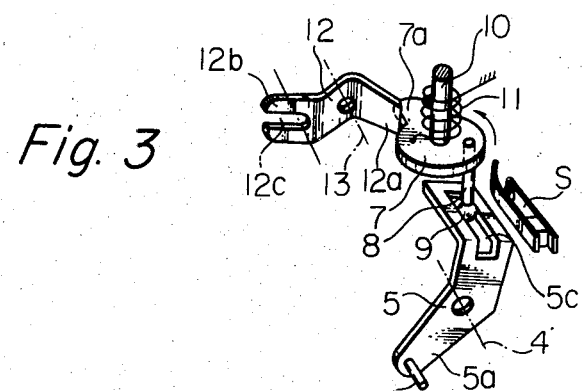
Fig. 3
FIG. 4A 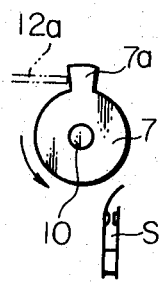  FIG. 4B 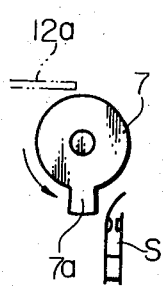  FIG. 4C 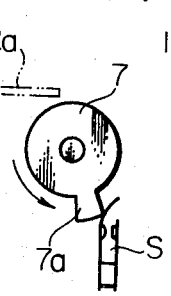  FIG. 4D 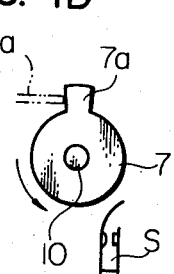
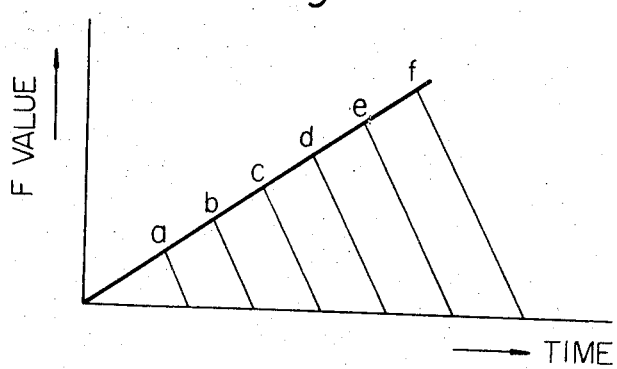
Fig. 5

3,643,562

PROGRAMMING SHUTTER FOR A PHOTOGRAPHIC CAMERA

BACKGROUND OF THE INVENTION

The present invention relates to a programming shutter for a photographic camera, and more particularly, to a shutter blade operating mechanism and a flash synchronizing circuit of a programming shutter in which the shutter blades are opened to a varying extent to define the effective aperture of the objective corresponding to the scene brightness for obtaining the proper exposure.

Prior art programming shutters are complicated in construction and a proper synchronization of a flash mechanism can not be obtained, because the amount of the movement of the shutter blades varies in accordance with the scene brightness thereby requiring manual operation of the flash mechanism by setting the shutter speed to a low speed.

SUMMARY OF THE INVENTION

An object of the present invention is to provide programming shutter which is simple in construction and accurate in operation.

Another object is to provide a programming shutter of the type described above in which a flash synchronizing circuit is incorporated which is accurate in operation over a wide range of variation in the scene brightness.

A still further object of the present invention is to provide programming shutter of the type described above in which the operation of the shutter is automatically blocked when the scene brightness or the distance set in the camera for the exposure is inappropriate for obtaining the proper exposure.

The above objects are achieved in accordance with the present invention by providing in the programming shutter a first lever adapted to be pivoted through a predetermined angle by an actuator disc rotated through another fixed angle each time the shutter is released, a second lever connected to a shutter blade operating ring so as to open the shutter blades to an objective aperture determined by the pivoting movement of the second lever, and a third lever interposed between the first and second levers with its free end portion engaging a radial face of the first lever while the radial face of the third lever engages the free end of the second lever so as to move the second lever by means of the first lever through the third lever, the position of the pivot axis of the third lever relative to the first and second levers being varied in accordance with the scene brightness by a motion transmitting train coupled with the exposure meter of the shutter so that the pivoting angle of the second lever is varied in accordance with the scene brightness at a constant pivoting angle of the first lever thereby permitting the shutter blades to be opened to an effective aperture corresponding to the scene brightness for the proper exposure.

A switch in the flash synchronizing circuit of the shutter is located adjacent to the actuator disc or the first lever so as to be closed by the movement of the actuator disc or the first lever thereby actuating the flash mechanism connected to the synchronizing circuit. Since the amount of the movement of the actuator disc or the first lever is constant, the switch is closed at a predetermined time in the operation of the shutter regardless of the amount of the movement of the shutter blades determined by the scene brightness thereby permitting the actuation of the flash mechanism to be properly synchronized with the time in which the shutter blades are fully opened in accordance with the scene brightness.

In accordance with a further feature of the present invention, the exposure control circuit of the shutter is switched to be connected to a variable resistor mounted on a distance adjusting ring of the camera in place of the photoelectric element, the resistance of the resistor being varied in accordance with the adjustment of the ring thereby permitting the opening of the shutter blades to be varied in accordance with the distance set in the distance adjusting ring so that the proper flash photograph is achieved over the wide range of variation in the distance set in the camera for the exposure.

BRIEF DESCRIPTION OF THE DRAWINGS

FIG. 3 is a fragmentary perspective view of elements in the shutter of FIG. 2;

FIGS. 4(A) to 4(D) show four phases of operation of the device of FIG. 3;

FIG. 5 is a diagram showing the characteristic curves of the programming shutter of the present invention;

DETAILED DESCRIPTION OF THE PREFERRED EMBODIMENTS

Figure 1:
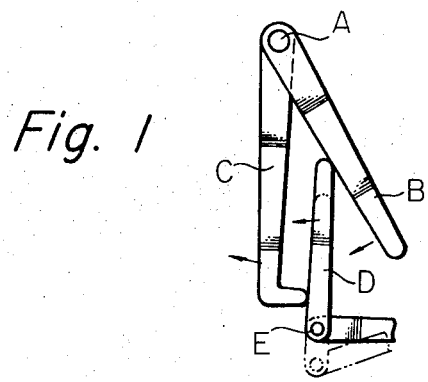
FIG. 1 is a schematic view showing the principle of operation of elements of the present invention.

Referring to FIG. 1, a lever B and a lever C are pivoted about a common pivot shaft A, and a lever D pivoted about a pivot shaft E is interposed between the lever B and the lever C with its tip contacting a face of the lever B which is radial relative to the pivot axis of the lever B while the radial face of the lever D contacts the free end of the lever C. Therefore, the lever C is rotated in a clockwise direction when the lever B is rotated in the clockwise direction by the interposition of the lever D. When the lever B is rotated through a predetermined angle each time the shutter is actuated, and the vertical position of the pivot shaft E is varied in accordance with the scene brightness sensed by the exposure meter (not shown), the amount of the rotation of the lever C varies with position of the lever D although the amount of the rotation of the lever B is constant. The lever C may be coupled with a shutter blade operating ring (not shown) so that the extent of opening of the shutter as determined by the shutter blades is varied with the scene brightness. Thus a proper exposure is achieved regardless of the scene brightness by utilizing the variation in the transmission ratio between the lever B and C in FIG. 1.

Figure 2:
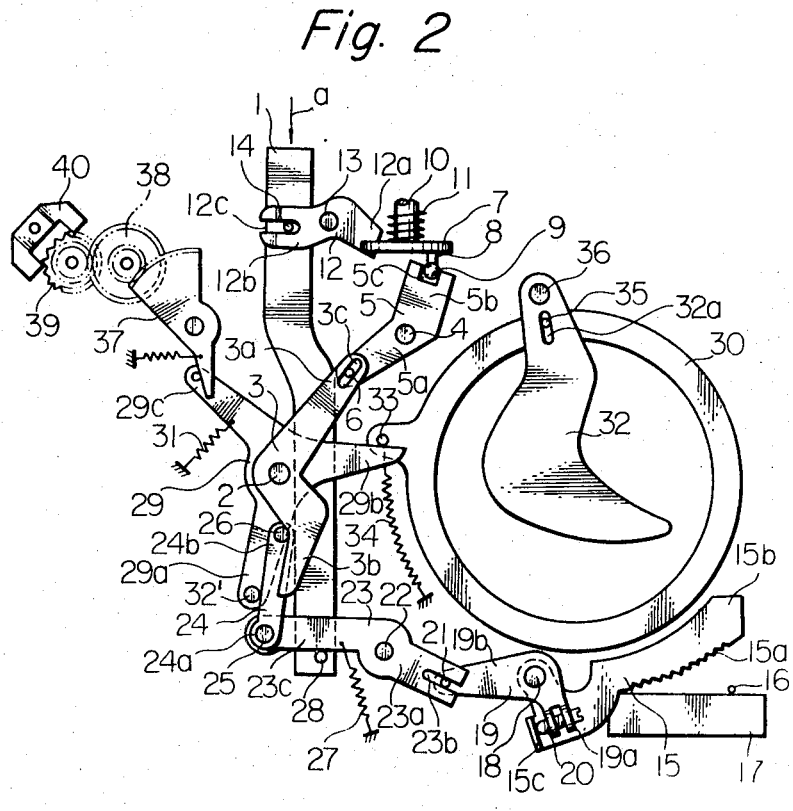
FIG. 2 is a fragmentary elevational view of a programming shutter of the present invention.

FIG. 2 shows the construction of an embodiment of the programming shutter of the present invention in which the shutter blades are used simultaneously for determining the lens opening.

In FIG. 2, a release rod 1 is normally urged upwardly by a spring (not shown). The release rod 1 is provided with a pin 14 fixedly secured thereto. A stopper lever 12 pivoted about a pivot pin 13 has two arms 12a and 12b, and a bifurcation 12c formed at the free end of the arm 12b engages the pin 14. An actuator disc 7 is rotatably mounted by a shaft 10 adjacent to the arm 12a and biased counterclockwise by a spring 11 provided around the shaft 10 when the shutter is cocked. The rotation of the actuator disc 7 is prevented by a projection 7a (FIG. 3) formed in the periphery of the disc 7 which releasably abuts against the arm 12a of the lever 12. When the release rod 1 is depressed against the action of the spring, the lever 12 is rotated by the engagement of the pin 14 with the bifurcation 12c of the lever 12 so that the arm 12a is disengaged from the projection 7a of the disc 7 thereby permitting the disc 7 to be rotated (FIG. 3). The disc 7 is provided with a pin 8 having a spherical portion 9 at the tip thereof which is secured to the disc 7 adjacent to the periphery thereof at about a right angle with respect to the projection 7a. A lever 5 is pivotably mounted on a shaft 4 beneath the disc 7, and an elongated slot 5c formed in a horizontally extending lug of the lever 5 extending from the free end of the upper arm 5b of the lever 5 slidably engages the spherical portion 9 of the pin 8 so that the lever 5 is swung back and forth when the disc 7 is rotated by one revolution upon actuation of the release rod 1.

A swingable lever 3 pivoted about a pivot shaft 2 has an upper arm 3a and a lower arm 3b, and a pin 6 secured to the free end of the lower arm 5a slidably engages an elongated hole 3c formed in the free end of the upper arm 3a of the lever 3 so that the lever 3 is reciprocally swung by an angle determined by the swinging movement of the lever 5 when the release rod 1 is actuated. A three armed lever 29 having arms 29a, 29b and 29c is pivotally mounted on the pivot shaft 2 and biased counterclockwise by a spring 31. A sensing lever 24 pivotally mounted on the free end of an arm 23c of a lever 23 by a pivot shaft 25 secured to the free end of the arm 23c is interposed between the lower arm 3b of the lever 3 and the lower arm 29a of the lever 29, and a pin 26 secured to the upper free end of the lever 24 is urged against the lower arm 3b of the lever 3 at the intermediate portion thereof and a pin 32' secured to the free end of the lower arm 29a of the lever 29 is urged against the lever 24 at the intermediate portion thereof by the action of the spring 31.

The lever 23 is pivoted about a pivot pin 22 and a bifurcation 23b formed in the free end of the arm 23a of the lever 23 slidably engages a pin 21 secured to the free end of the arm 19b of a lever 19 pivoted about a pivot shaft 18 and having arms 19a and 19b.

The lever 23 is biased counterclockwise by a spring 27. The rotation of the lever 23 is stopped by a stopper pin 28 secured to the lower end of the release rod 1. An adjusting screw 20 is threaded in the bifurcation formed at the free end of the arm 19a of the lever 19.

A pointer arresting lever 15 is pivoted about the pivot pin 18. The lever 15 is provided with a serrated pointer arresting cam 15a in the lower edge of the arm 15b of the lever 15 and a bent portion 15c extending from an intermediate portion of the lever 15. The lever 15 is biased counterclockwise relative to the lever 19 by a spring (not shown) so that the adjusting screw 20 abuts against the bent portion 15c.

An abutment plate 17 is provided beneath the lever 15 so that the lever 15 can move downwardly along the side surface of the abutment plate 17 beyond the upper edge of the plate 17. A pointer 16 of a galvanometer (not otherwise shown) of an exposure meter is located adjacent to the upper edge of the abutment plate 17 so that the pointer 16 is moved along the upper edge of the plate 17 in accordance with the variation in the scene brightness. In this embodiment, the pointer 16 is moved to the right when the scene brightness is low and it is moved to the left when the scene brightness is high. Thus, the range of clockwise rotation of the lever 15 when the scene brightness is low is greater than when the scene brightness is high.

Thus, when the lever 15 is moved in the clockwise direction, the pointer 16 is clamped between the cam 15a and the upper edge of the plate 17, and the position of the lever 15 at which the pointer 16 is fixedly clamped varies in accordance with the position of the pointer 16 which is in turn the function of the scene brightness. Therefore, the position of the lever 15 at which the pointer 16 is clamped is indicative of the scene brightness.

The levers 3, 29 and 24 correspond to the levers B, C and D in FIG. 1, respectively.

A shutter blade operating ring 30 rotatably mounted in the shutter is provided with pins 35 one of which is shown in FIG. 2 and biased counterclockwise by a spring 34, and shutter blades 32 one of which is shown in FIG. 2 are pivoted about pivot pins 36 one of which is shown in FIG. 2. Each of the shutter blades 32 has an elongated hole 32a which slidably receives the respective pin 35 of the ring 30 so that, when the ring 30 is rotated back and forth, the shutter blades 32 are opened and closed. The size of the opening determined by the shutter blades 32 when they are in the fully opened positions depends upon the amount of rotation of the ring 30.

The ring 30 is provided with a pin 33 fixedly secured to a projection formed in the outer periphery of the ring 30 and the pin 33 abuts against the arm 29b of the lever 29 by the action of the spring 34. A sector gear 37 of a governor mechanism consisting of the sector gear 37, pinion-gear 38 and escapement 39 and 40 is engaged with a pin secured to the free end of the arm 29c by means of a spring as shown. In the position shown in FIG. 2, the shutter blades 32 are held in the closed positions.

The operation of the shutter described above is as follows. The shutter is first cocked to tension the spring 11. When the scene brightness is low, the pointer 16 is positioned at the right side of the abutment plate 17. When the release rod 1 is depressed, the pin 28 moves downwardly so that the lever 23 is turned counterclockwise by the action of the spring 27 and the levers 19 and 15 are rotated in the clockwise direction by the pin-slot engagement 21, 23b thereby clamping the pointer 16 between the arresting cam 15a and the upper edge of the abutment plate 17. Since the amount of the clockwise rotation of the lever 15 is greater than that when the scene brightness is high, the lever 24 is positioned at a lower position in the range of movement thereof when the pointer 16 is clamped than the position given when the scene brightness is high.

As the release rod 1 is further depressed and the lever 12 is rotated counterclockwise, the arm 12a of the lever 12 is disengaged from the projection 7a of the disc 7 so that the disc 7 is rotated by the action of the spring 11 as shown in FIG. 3 thereby swinging the lever 5 forth and back by the engagement of the spherical portion 9 of the pin 8 with the slot 5c. The swinging of the lever 5 in the first half rotation of the disc 7 causes the swinging of the lever 3 by a fixed angle. Thus, the lever 29 is rotated in the clockwise direction by the interposition of the lever 24 between the arm 3b and the arm 29a. Since the lever 24 is positioned at a lower position in response to the low scene brightness, the amount of rotation of the lever 29 is made greater than that when the scene brightness is high. Thus, the amount of the rotation of the lever 29 is indicative of the scene brightness. When the lever 29 is rotated in the clockwise direction, the shutter blade operating ring 30 is rotated counterclockwise by the action of the spring 34 so as to open the shutter blades 32. The rotation of the ring 30 is determined by the amount of the clockwise rotation of the lever 29 so that the size of the opening determined by the shutter blades 32 when fully opened is made to correspond to the scene brightness. At the same time, the clockwise rotation of the lever 29 causes the operation of the governor mechanism 37–40 so as to slow down the rotational speed of the ring 30 for the proper operation of the shutter in accordance with the amount of the clockwise rotation of the lever 29.

During the second half revolution of the disc 7, the levers 5, 3, 24 and 29 are rotated in the reverse directions to their initial positions respectively so that the ring 30 is rotated in the clockwise direction to its initial position so as to close the shutter blades 32 for the proper exposure in accordance with the scene brightness.

During the returning rotation of the lever 29, the governor mechanism is inoperative. Therefore, the ring 30 is rotated quickly so as to instantaneously close the shutter blades 32.

When the release rod 1 is freed, the release rod 1, the lever 23 and the lever 12 are moved to their initial positions so that the entire arrangement is returned to the initial position thereof. When the shutter is cocked to tension the spring 11, the shutter is ready for the next operation.

When the scene brightness is high, the pointer 16 is moved to the left so that the lever 24 is positioned in a higher position than the position given when the scene brightness is low thereby making the size of the opening defined by the opened shutter blades 32 small in response to the high scene brightness. Thus, the proper exposure is obtained in accordance with the scene brightness.

In accordance with the present invention, a flash synchronizing circuit for a flash mechanism is provided. The flash synchronizing circuit comprises a normally open switch S located adjacent to the periphery of the actuator disc 7 as shown in FIG. 3 with the movable contact of the switch S being located in the path of movement of the projection 7a of the disc 7 so as to be actuated thereby when the disc 7 is rotated. The location of the switch S is so determined that it is closed by the projection 7a when the disc 7 is rotated slightly beyond one half of its rotation as shown in FIG. 4 (C) so as to compensate for the mechanical delay in movement of the levers 5, 3, 24 and 29 for opening the shutter blades 32. In the position of the disc 7 shown in FIG. 4 (C), the shutter blades 32 are kept opened so as to insure the proper synchronizing operation of the flash mechanism regardless of the difference in the size of the opening defined by the shutter blades 32 in their opened state resulting from the difference in the scene brightness. The flash mechanism, as far as not illustrated may be conventional and therefore, is not described here in detail.

When there is no mechanical delay in the movement of the levers 5, 3, 24 and 29, the switch S may be located in a position at which the switch S is closed when the projection 7a of the disc 7 is rotated just one half turn.

In the embodiment shown, the switch S is shown as being located adjacent to the disc 7 so as to be actuated thereby. However, it is apparent that the switch S may be located at any position adjacent the lever 5 or the lever 3 where the switch S is actuated by the movement of the lever 5 or 3 corresponding to the amount of the rotation of the disc 7 to actuate the switch S as shown in FIG. 4 (C).

In accordance with the present invention, the shutter may be used together with the flash mechanism to achieve the proper exposure in accordance with the distance between the object and the camera instead of the scene brightness.

In this case, the flash synchronizing circuit is arranged so as to disconnect the galvanometer of the exposure meter from the photoelectric element of the exposure meter and connect the galvanometer to a variable resistor mounted on a distance adjusting ring of the objective of the camera when the flash mechanism is mounted on the camera by fitting the foot of the flash mechanism into the mounting shoe of the camera, for example. Thus, the pointer 16 of the galvanometer is moved in accordance with the resistance of the variable resistor. The variable resistor is so mounted on the distance adjusting ring that, when the distance adjusting ring is adjusted for a long distance, the resistance of the resistor is increased so as to move the pointer 16 to the right in FIG. 2. By this arrangement, the opening of the shutter is made greater as the distance adjusting ring is adjusted for a long distance thereby permitting the proper exposure to be obtained in accordance with the distance.

Similarly, when the distance adjusting ring is adjusted for a shorter distance, the opening of the shutter is made small so as to obtain the proper exposure.

FIG. 5 shows the various characteristic curves of the F value, i.e., the opening of the shutter blades with respect to the time elapsed. At any F value, the flash mechanism is actuated at the respective fully opened state of the shutter blades for the proper synchronization thereof by virtue of the switch S actuated by the disc 7 or the lever 5 or 3 the movement of each of which is predetermined regardless of the variation in the opening of the shutter blades in accordance with the scene brightness or the distance adjusted in the distance adjusting ring.

Figure 6:
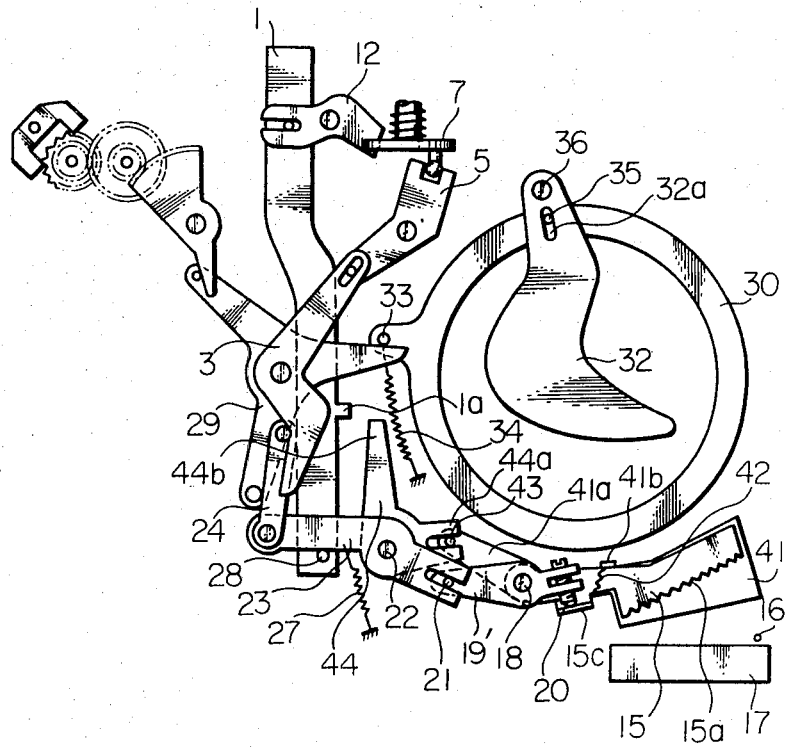
FIG. 6 is a view shows a modification of the shutter of FIG. 2.

FIG. 6 shows a modification of the programming shutter shown in FIG. 2 in which the operation of the release rod 1 is automatically prevented when the scene brightness or the distance adjusted in the distance adjusting ring is improper for the proper exposure.

In this embodiment, the general arrangement is similar to that shown in FIG. 2 except that a stopper lug 1a is provided on the release rod 1 and an L-shaped blocking lever 44 is pivotally mounted on the pivot shaft 22 with the blocking arm 44b thereof located adjacent to the stopper lug 1a while the bifurcation 44a of the lever 44 slidably receives a pin 43 secured to the free end of the arm 41a of a pointer holding cam 41 pivoted about the pivot shaft 18. The cam 41 has a bent lug 41b which secures one end of a spring 42. The other end of the spring 42 is secured to the bent portion 15c of the lever 15 so that the cam 41 is urged in the clockwise direction by the spring relative to the pointer arresting lever 15 until the bent lug 41b abuts against the lever 15.

The length of the projecting portion of the cam 41 which engages the pointer 16 and the serrated cam 15a of the lever are so determined that, when the pointer 16 is positioned in the range of movement capable of obtaining the proper exposure, the cam 41 and the cam 15a can engage the pointer 16, while the cam 41 and the cam 15a do not engage the pointer 16 when the same is positioned outside of that range so that the cam 41 and the lever 15 are free to move downwardly beyond the positions at which the pointer 16 is clamped thereby.

Figure 7:
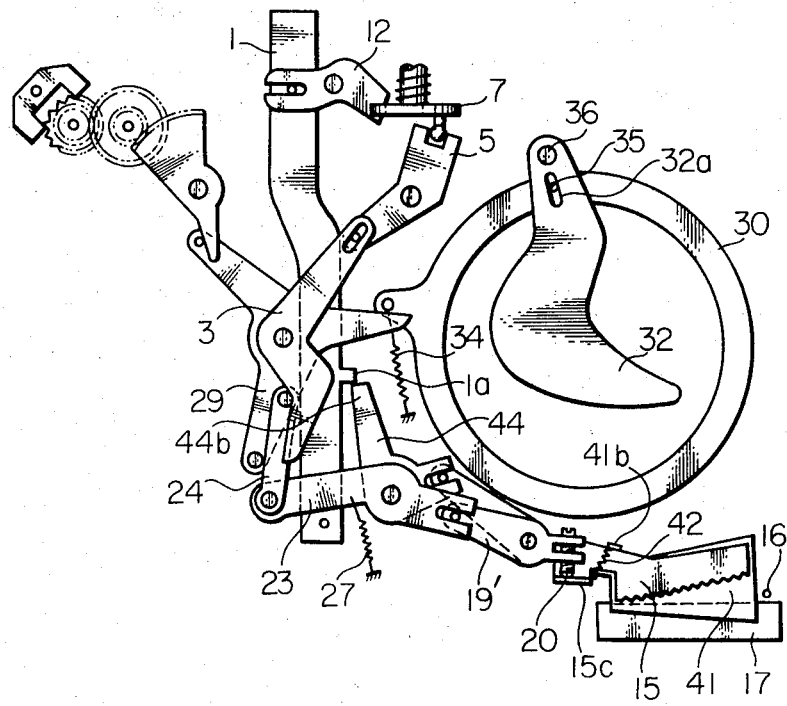
FIG. 7 illustrates the shutter of FIG. 6 in a different operating position.

Therefore, when the pointer 16 is positioned within the range of movement thereof capable of obtaining the proper exposure, the pointer 16 is clamped by the cam 41 and the cam 15a so that the shutter blades 32 are opened for the proper exposure by the action of the release rod 1, while, when the pointer 16 is positioned outside of that range, the cam 41 moves downwardly without engaging the pointer to a position in which the blocking lever 44 is rotated counterclockwise by the engagement of the pin 43 with the bifurcation 44a so as to move the blocking arm 44b into the path of movement of the stopping lug 1a so that the further depression of the release rod 1 is prevented by the abutment of the blocking arm 44b against the stopper lug 1a thereby preventing the actuation of the shutter. FIG. 7 shows the position of the shutter of FIG. 6 in which the operation of the shutter is blocked.

Figure 8:
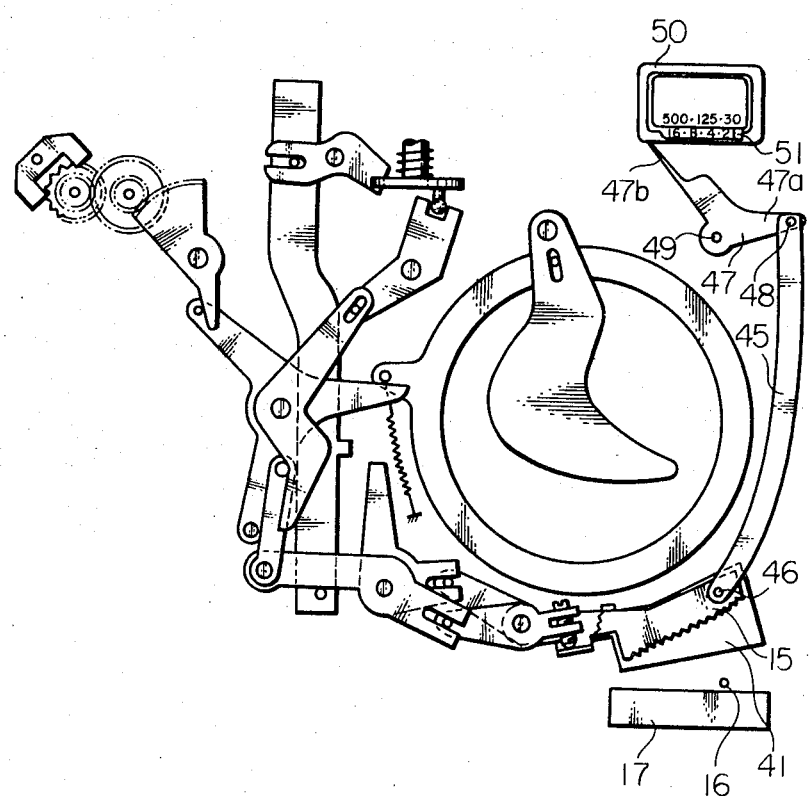
FIG. 8 shows a modification of the shutter of FIG. 6.

FIG. 8 shows a further modification of the shutter of FIG. 6 in which an indication is given in the view finder of the camera whether or not the condition of the scene brightness or the distance adjusted in the distance adjusting ring is adequate for the proper exposure.

This embodiment is particularly useful in a camera in which the galvanometer of the exposure meter is located at the lower side of the camera between the film-supplying chamber and the film-receiving chamber so as to make the camera compact as in the case of the camera of the present invention shown in the drawings.

In this embodiment, a lever 47 having a pointer 47b is pivoted about a pivot shaft 49 so that the pointer 47b is displayed in the finder 50. An arm 47a of the lever 47 is pivotally connected to one end of a coupling rod 45 by a pin 48 secured to the free end of the arm 47a. The other end of the rod 45 is pivotally connected to the pointer arresting lever 15 by a pin 46 secured to the lever 15.

Thus, when the pointer 16 is positioned in accordance with the scene brightness or the distance adjusted in the distance adjusting ring and the release rod 1 is actuated for the exposure, the lever 47 is rotated by the coupling rod 45 so that the pointer 47b of the lever 47 is moved in the finder 50 to a position corresponding to the position of the lever 15 at which the pointer 16 is clamped between the lever 15 and the abutment plate 17. A red mark 51 is provided in the finder 50. The position of the red mark 51 is so determined that, when the lever 15 is moved beyond the pointer arresting position due to the inappropriate condition of the scene brightness or the distance adjusted in the distance adjusting ring for the proper exposure, the pointer 47b moves into the red mark 51 so as to indicate the inappropriate condition for the proper exposure. Thus, the operator is conveniently informed of the inappropriate condition through the finder 50. A scale of the shutter speed or the light value may be provided in the finder 50 so as to cooperate with the pointer 47b for indicating the shutter speed or the light value as set in accordance with the scene brightness or the distance adjusted in the distance adjusting ring.

We claim:

1. In a shutter for a photographic camera having a release member, a plurality of shutter blades movable between respective open and closed positions, a shutter blade operating member operatively interposed between said release member and said shutter blades for moving said blades between said positions thereof in response to operation of said release member, and photoelectric exposure control means operatively connected to said operating member for sensing the brightness of a photographed scene and for controlling the movement of said blades in response to the sensed brightness scene, the improvement which comprises:

a. a disc member;
b. means responsive to operation of said release member for turning said disc member through a first fixed angle;
c. a first lever member coupled to said disc member for pivoting movement through a second fixed angle in response to the turning of said disc member through said first angle;
d. a second lever member pivotally mounted and coupled to said operating member for moving the latter and for thereby moving said blades from said closed toward said open position thereof to an extent corresponding to the pivoting movement of said second lever member;
e. a third lever member mounted for pivoting movement,
  1. each of said first, second, and third lever members having a pivot axis, a free end portion remote from said pivot axis, and a face radially extending from said pivot axis toward said free end portion,
  2. the free end portion of said third lever member engaging said face of said first lever member,
  3. the free end portion of said second lever member engaging said face of said third lever member; and
f. motion transmitting means interposed between said exposure control means and said third lever member for shifting the pivot axis of said third lever member and for thereby simultaneously shifting the points of engagement of said third lever member with said first and second lever members toward the pivot axes of said first lever member and said third lever member respectively when said pivot axis of said third lever member is shifted in a first direction, and for simultaneously shifting said points of engagement away from said pivot axes of said first and third lever members respectively when said pivot axis of the third lever member is shifted in a second direction opposite to said first direction,
  1. said motion transmitting means shifting said pivot axis of the third lever member in one of said first and second directions in response to a decrease in said brightness, and in the other one of said first and second directions in response to an increase in said brightness,
  2. said second lever member moving said operating member in response to the movement of said first lever member as transmitted by said third lever member at a transmission ratio determined by the positions of said points of engagement.

2. In a shutter as set forth in claim 1, a flash circuit including a normally open switch, and switch actuating means connected to said disc member for joint movement and engageable with said switch for closing the same in response to the turning of said disc member, whereby a flash mechanism connected to said circuit may be actuated in synchronism with the movement of said shutter blades between said positions thereof.

3. In a shutter as set forth in claim 1, blocking means engageable with said release member for blocking operation of the same, and connecting means connecting said blocking means to said exposure control means for moving said blocking means into a position of engagement with said release member in response to a predetermined sensed brightness.

4. In a shutter as set forth in claim 1, display means movable for displaying the sensed brightness, and coupling means coupling said display means to said third lever member for simultaneous movement.

* * * * *